United States Patent [19]

Adolf et al.

[11] Patent Number: 5,421,150
[45] Date of Patent: Jun. 6, 1995

[54] MACHINE FRAME FOR A TEXTILE MACHINE

[75] Inventors: Hermann Adolf, Ingolstadt; Bernhard Stang, Kipfenberg; Karl Zopfl, Ingolstadt, all of Germany

[73] Assignee: Rieter Ingolstadt Spinnereimaschinehbau AG, Ingolstadt, Germany

[21] Appl. No.: 105,371

[22] Filed: Aug. 6, 1993

[30] Foreign Application Priority Data

Aug. 13, 1992 [DE] Germany .............. 42 26 774.9

[51] Int. Cl.⁶ .................................... D01H 13/00
[52] U.S. Cl. ................................ 57/1 R; 57/406
[58] Field of Search ............................. 57/1 R, 406

[56] References Cited

U.S. PATENT DOCUMENTS

| | | |
|---|---|---|
| 3,381,458 | 5/1968 | Rajnoha et al. . |
| 4,031,690 | 6/1977 | Thomas et al. .............. 57/1 R |
| 4,204,391 | 5/1980 | Clayton et al. .............. 57/1 R |
| 4,255,925 | 3/1981 | Marzoli ................. 57/1 R X |
| 4,330,987 | 5/1982 | Schippers et al. . |
| 4,516,396 | 5/1985 | Stahlecker et al. ......... 57/1 R X |
| 4,862,686 | 9/1989 | Stadele et al. ............... 57/1 R |

FOREIGN PATENT DOCUMENTS

| | | |
|---|---|---|
| 1511000 | 4/1971 | Germany . |
| 7148737.1 | 4/1972 | Germany . |
| 2925697 | 1/1981 | Germany . |
| 3720631 | 1/1989 | Germany . |
| 40623 | 2/1989 | Japan ..................... 57/1 R |

*Primary Examiner*—Joseph J. Hail, III
*Attorney, Agent, or Firm*—Dority & Manning

[57] ABSTRACT

In a textile machine, the machine frame is provided with frame walls made of sheet metal, each of which being made as a bearing element. For this purpose the frame walls are provided with 90 degree offset edges and are connected by combined plug-in and screw connections to connection elements and via the latter to at least one additional frame wall and receive structural and function elements by additional combined plug-in and screw connections.

19 Claims, 2 Drawing Sheets

MACHINE FRAME FOR A TEXTILE MACHINE

BACKGROUND OF THE INVENTION

The instant invention relates to a machine frame for a textile machine which contains frame walls made of sheet metal.

In a known machine frame design, a supporting frame composed of individual supports is provided with an outer skin on its outside (DE-GM 7.148.737). When such a machine frame is assembled, there is a danger that the supporting frames become deformed, even before the metal sheets constituting the outer wall can be installed, so that dimensional errors remain as a result. The different aggregates must be adjusted precisely by means of gauges, and this can only be done after completion of the assembly. This is very labor-intensive.

OBJECTS AND SUMMARY OF THE INVENTION

It is therefore a principal object of this invention to create a machine frame which is light on the one hand, and on the other hand allows for precise attachment and installation with accuracy of measurement of the different aggregates in a simple manner. Additional objects and advantages of the invention will be set forth in, or may be obvious from, the following description, or may be learned by practice of the invention.

The objects are attained by the invention in that the frame wall is made as a bearing element, is provided with 90 degree offset edges, and is connected to connecting elements by means of combined plug-in and screw connections and via these connecting elements to at least one other frame wall and receives structural and functional elements by means of additional plug-in and screw connections. The frame walls, which are made in the form of sheet metal walls, thus constitute the machine frame. Sheet metals can be punched out very precisely and therefore allow for a very precise placement of bores and openings. This aspect is utilized according to the invention in that the connections with other frame walls and, insofar as this is provided, with structural and functional elements such as supports, deflector rollers, drive motors, gears and their wheels, etc. are made in the form of combined plug-in and screw connections. The connections therewith can be direct in this case, or they can be effected via their supporting devices which (as shall be described later) can also be utilized for support and reinforcing functions so that they complement the effect of the 90 degree offset edges. The precise connection between the machine frame walls, or to the above-mentioned structural and functional elements, is here effected by means of combined plug-in and screw connections, whereby the plug-in connections ensure precise placement and the screw connections a solid connection. Since the bores and openings are produced by embossing, manufacture is extremely time-saving while a high accuracy of measurement is maintained, so that the finishing machining and adjustments which would normally have to be made are omitted.

The connection element is preferably made in the form of an angle which is advantageously made of sheet metal, as are the walls, i.e. in the form of a sheet-metal angle, and is provided with at least one welded-on sheet-metal support or web member.

In order to increase the rigidity of the machine frame, the connection element can be welded to the adjoining frame walls at least in segments. This can be carried out easily since the parts to be combined by welding have previously been fixed precisely in their desired relative positions by the combined plug-in and screw connections.

In a simple and therefore preferred embodiment of the invention, the plug-in connection is established by pins entering holes.

In order to increase the rigidity it is advantageous, when the machine frame wall has one or several recesses, to provide also these with 90 degree offset edges. For aesthetic reasons the 90 degree offset edges of the machine frame wall are advantageously directed toward the interior of the machine frame, so that a substantially smooth outer surface of the machine frame is obtained.

In a preferred embodiment of the invention, and independently of the above-mentioned connection element, several machine frame walls are connected to each other by means of a sheet-metal profile. It is possible to provide here for the machine frame wall to be subdivided into several wall sections arranged in one plane and connected to each other by the sheet metal profile. In an advantageous embodiment of the machine frame according to the invention, the sheet metal profile can also extend transversely to the end edges of wall sections placed next to each other. It may, however also be advantageous if two machine frame walls facing each other with their flat walls are connected to each other by the sheet-metal profile.

An advantageous further of the invention embodiment provides for the sheet metal profile to be U-shaped.

If desired, the sheet-metal profile can merely serve to increase the rigidity of a machine frame wall which is subdivided into several wall sections. Preferably however, the invention provides for the sheet metal profile to be made in the form of support for structural and/or functional elements such as supports (consoles), motors, gearings, tension devices, etc. if possible, so that additional supporting elements can be avoided.

It is advantageous for holding, supporting and reinforcing purposes if the machine frame is provided with at least one intermediate wall made of sheet metal and acting as a bearing element.

To increase rigidity and to enable a light-weight frame, it is possible to reinforce the corners of the machine frame with attached sheet-metal corners.

The invention makes it possible to produce the machine frame of a textile machine, e.g. the end stock of a spinning machine at one and/or at both ends of the spinning machine, in a simple light manufacturing manner. Since the adjustments during assembly can be omitted due to the placement for assembly having already been predetermined precisely by embossing, the correct installation of the different elements provided in the machine frame can be effected rapidly, exactly, and in a simple manner. The otherwise lengthy machining of assembly surfaces and the alignment and placement by means of gauges can thus be omitted. This is achieved not only for those elements which are attached only to one single wall but also for those which are located by several different surfaces which are not in one and the same plane. For this purpose, different walls or wall sections are aligned with each other exactly by means of the plug-in connections and the connecting elements and the sheet-metal profiles and are fixed in this aligned position by means of screw connections.

The invention is explained in further detail below with the help of drawings, which constitute a part of the description.

DETAILED DESCRIPTION OF THE PREFERRED EMBODIMENTS

Figure 1:
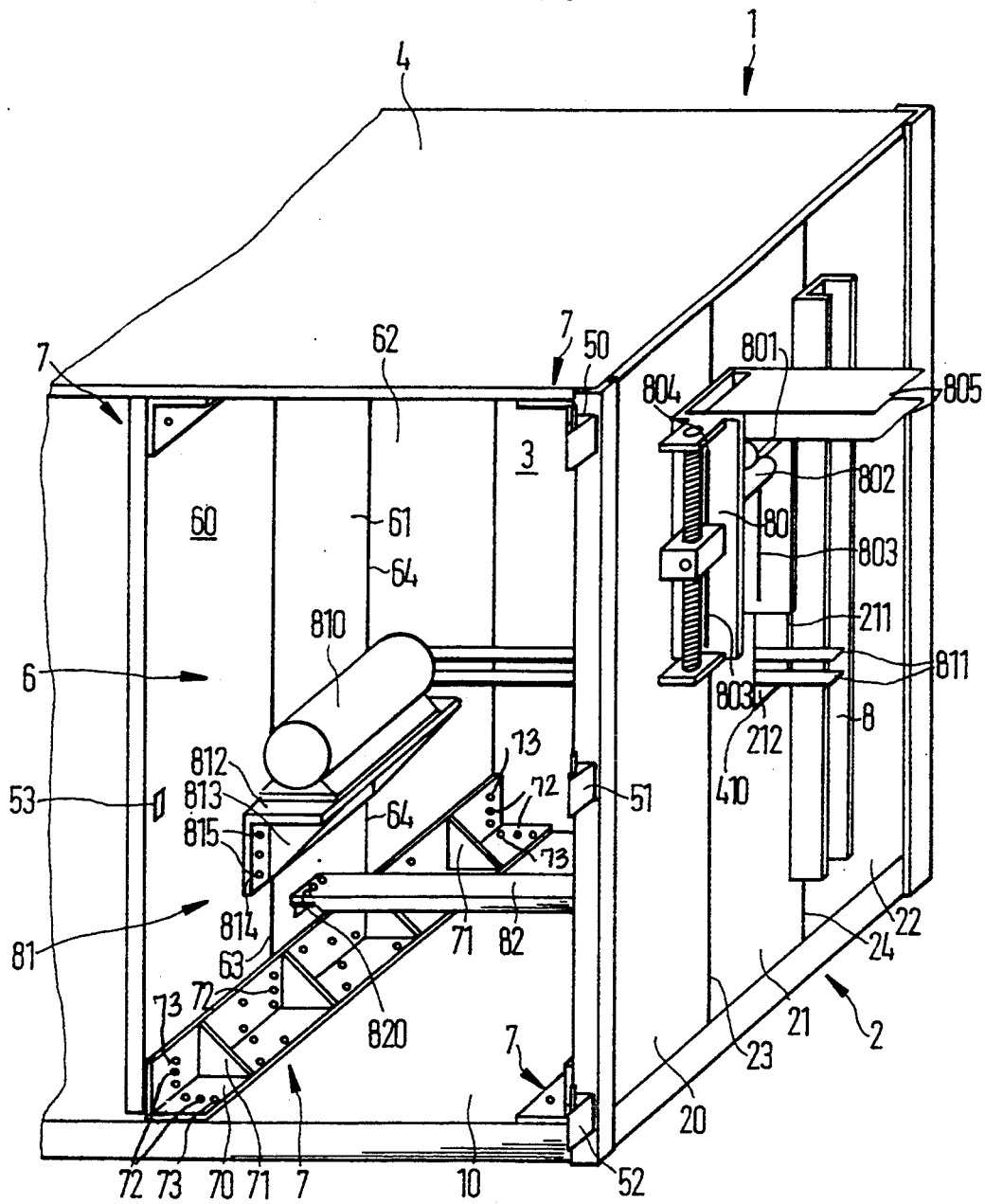
FIG. 1 shows a machine frame designed according to the invention, in the form of the end stock of a spinning machine shown in perspective, whereby the connection to the spinning machine is not shown for the sake of greater clarity.

Reference will now be made in detail to the presently preferred embodiments of the invention, examples of which are illustrated in the drawings. Each example is provided by way of explanation, and not limitation of the invention. The numbering of components in the description is consistent, with the same components having the same number throughout.

The invention is described below through the embodiment of an end stock of a spinning machine, e.g. an open-end spinning machine, with no claim to completeness of the drawings. All of the elements which are not necessary for an understanding of the invention have been omitted in the drawings for the sake of greater clarity.

However, the invention can not only be used for the end stocks of long textile machines, i.e. a ring spinning machine or a rotor spinning machine, but also for blow room machines, etc. FIG. 1 shows merely part of a machine end stock, with the sections with the work stations (open-end spinning stations, not shown) connected thereto on the right side of the drawing.

The machine frame 1 is provided with a bottom 10 made of a sheet-metal plate, a frame wall 2 turned toward the work stations (i.e., open-end spinning stations) of the spinning machine composed of three wall sections 20, 21, 22, a frame wall 3 and a cover plate 4. The left frame wall of the machine frame 1 is not shown, and only a segment of the forward frame wall 9 is shown. On this side of the machine frame an opening is provided for a door, as can be gathered from the three hinges 50, 51, 52.

The interior of the machine frame 1 is subdivided by an intermediate wall 6 which consists of three wall sections 60, 61 and 62 located in one and the same plane, as in the case of frame wall 2. A recess 53 for the latch of the door installed on the hinges 50, 51 and 52 is provided in the wall section 60. The frame walls, e.g. frame walls 2 and 3, including the intermediate wall 6, are made as bearing elements and are provided with 90 degree offset edges for that purpose. Such 90 degree offset edges, which are produced by bending the edges, are provided in the frame wall 2 under reference numbers 28, 26, 23, 25, 24 and 27 and in the intermediate wall 6 under reference numbers 67, 68, 63, 66, 64 and 65.

If no structural or functional elements are to be attached to the frame wall 3, it is sufficient if only the frame wall 3 is provided with 90 degree offsets 30, bent toward the main surface of the frame wall 3 and screwed, riveted, welded or otherwise connected to the wall sections 22 of the frame wall 2. The frame wall 3 is furthermore connected to the intermediate wall 6 whose wall section 62 is provided with an 90 degree offset edge 65 for that purpose.

Where accuracy of measurement is important, the frame walls are connected to each other by means of connection elements 7.

In this context, an outer wall, e.g. one of the frame walls 2, 3 or 9 etc., as well as the cover wall 4 and the bottom 10 and also the intermediate wall 6, is understood to be a frame wall.

As the figures show, the connection element 7 is made in the form of a sheet-metal angle 70 which is provided with at least one sheet-metal support 71 as a reinforcement. In the embodiment shown, one such sheet-metal support 71 is provided in sections for each wall section 60, 61 and 62, but this is not absolutely necessary.

The wall sections 60, 61 and 62 are connected by means of the connection element 7 and by means of a plug-in and screw connection. The plug-in connection, which is provided with two pins 72 per wall section 60, 61 and 62, ensures precise alignment of the wall sections 60, 61 and 62 in relation to the connection element 7, so that the wall sections 60, 61 and 62 are precisely aligned with each other via the connection element 7. The wall sections 60, 61 and 62 are fixed in their aligned position with accuracy of measurement by means of the screw connections (screws The bottom 10 on the one hand and the cover plate 4 on the other hand are also connected to the connection element 7, and here a combined plug-in connection (by means of pins 72) and screw connection (by means of screws 73) is again provided. The individual frame walls are in turn aligned precisely in relation to each other by means of the plug-in connection (pins 72) while the screws 73 fix these walls (including bottom 10 and cover 4) in their respective aligned positions here, too, with accuracy of measurement.

As FIG. 1 shows, two pins 72 are provided for each of the wall sections 60, 61 and 62. Similarly, only two pins 72 are also provided for the bottom 10 in order to avoid redundancy.

The wall sections 60, 61 and 62 are given such rigidity by the 90 degree offset edges 65, 64, 66, 63 and 67 that it is not necessary that a frame which should normally be used, and to which the needed structural and functional elements must be attached, would have to be interconnected on the outside by sheet metal skins. However, to ensure the precise positioning of the wall sections 60, 61 and 62 or 20, 21 and 22 in relation to each other, not only in the connecting zone to adjoining frame walls, provisions are made according to FIG. 1 that a U-shaped sheet metal profile 8 be provided between two adjoining wall sections 21 and 22. As FIGS. 1 and 2 both clearly show, the 90 degree offset edges 24 and 25 are directed toward the interior of the machine frame 1, while the sheet metal profile 8 establishes the connection between the two wall sections 21 and 22 on the side away from the interior of the machine frame. The 90 degree offsetting of the edges 26, 23, 25 and 24 can never be made with such precision that a connection of the wall sections 20, 21 and 22 via these edges 26 and 23 or 25 and 24 would lead to an accurately measured alignment of these wall sections 20, 21 and 22. The edges 26 and 23 or 25 and 24 are therefore located at a short distance from each other and the wall sections 20, 21 and 22 are (as described) accurately fixed in relation to each other by means of sheet-metal profiles, e.g. sheet metal profile 8. The sheet metal profile 8 is connected for that purpose to the wall sections 21 and 22 by means of a combined plug-in and screw connection.

The sheet metal profile can carry out other functions in addition to the connecting function. FIG. 1 shows, for example, a sheet-metal profile 80 which receives two deflection rollers (of which only deflection roller 801 is visible in the drawing) between its legs 800, as well as a tension roller 802, which are installed in slits 803 of the sheet metal profile 8 and can be brought into different positions within the slit 803 by means of a spindle. The deflection roller, which is not shown, as well as deflection roller 801 and tension roller 802, are used for the guidance and tensioning of a drive belt 805 which may serve various purposes.

Figure 2:
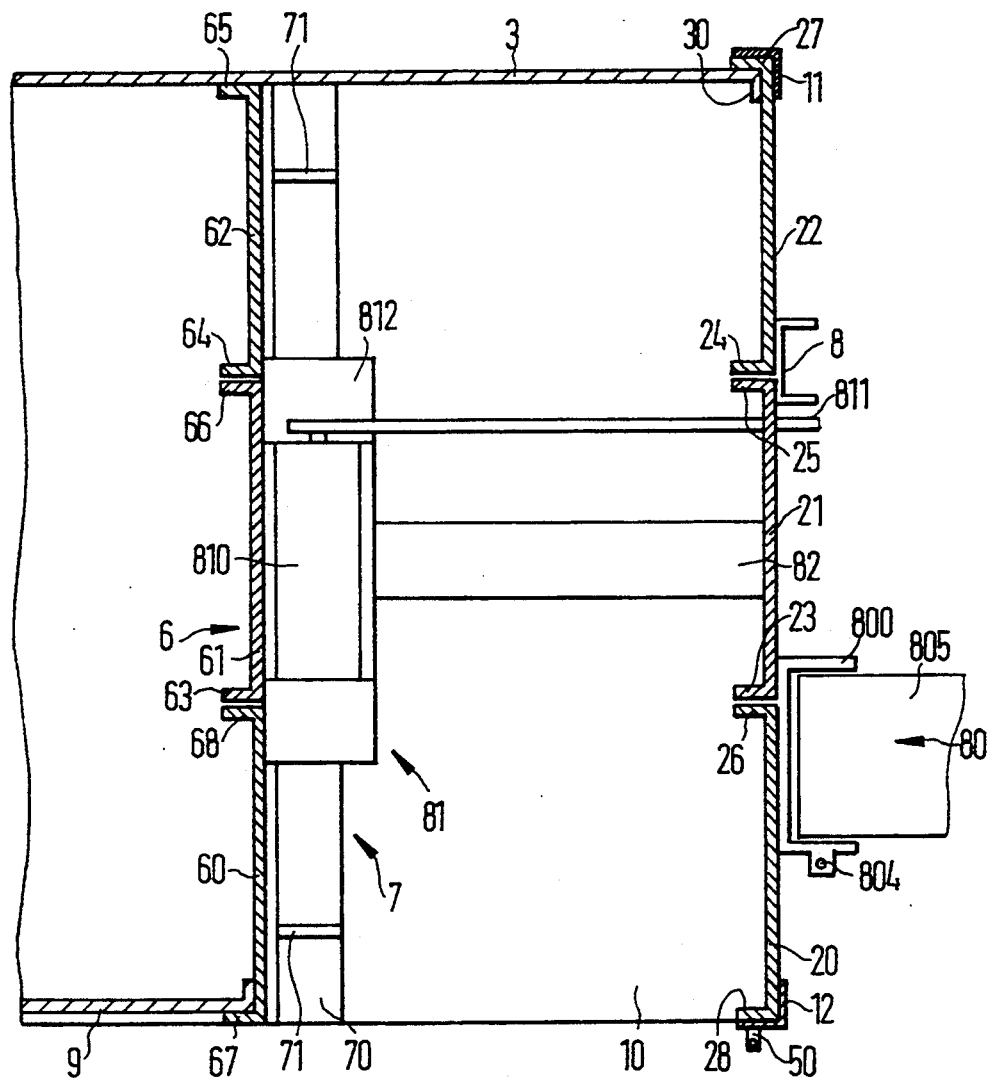
FIG. 2 shows a top view of a partial section of the end stock shown in FIG. 1.

It is not necessary for the sheet metal profiles to be parallel with the edges 24, 25, 23, 26, 27 and 28 (see FIG. 2). According to FIGS. 1 and 2, a sheet metal profile 81 in the form of a console on which a motor 810 driving a belt 811 is installed is provided in the interior of the machine frame 1. The sheet-metal profile 81 extends in this embodiment at a right angle to the end edges (edges 68, 63, 66 and 64) of the wall sections 60, 61 and 62 and is constituted in this embodiment by a sheet metal angle 812 which is reinforced by means of sheet metal supports 813. This connection to wall sections 60, 61 and 62 is in turn again established by means of a combined plug-in and screw connection, as can be seen from pin 814 and screws 815. Thus, precise placement of the motor 810 in relation to the intermediate wall 6 and via the latter in relation to other, not shown aggregates, is possible. Structural and functional elements are thus connected via the sheet metal profile 80 to the frame wall (intermediate wall 6) with accuracy of measurement.

Other such aggregates and structural and functional elements, not shown here, can be installed on another sheet metal profile 82 which is again given a U-shape and extends across the interior of the machine frame 1 while connecting to each other two frame walls (frame walls 2 and 6) whose flat sides face each other and holding structural or functional elements, e.g. gears, which are not shown here. The U-shaped sheet metal profile can be held in place by means of sheet metal angles 820 which are again connected by means of combined plug-in and screw connections to the wall section 61 and 21 as well as to the U-shaped sheet metal profile 82. Here too, if it is desired, a sheet metal support (not shown) can be provided for the sheet metal angle 820. Since the attachment is effected in the same manner as explained before, by means of a combined plug-in and screw connection, precise alignment of the U-shaped sheet metal profile 82 is ensured also in this instance.

Suitable openings or recesses (windows) are provided in the appropriate frame walls for drive belts which extend from the inside of the machine frame 1 to the outside. Such an opening 410 or recess (FIG. 1) is provided for example for the belt 811. This opening 410 can be used for additional reinforcement of a wall section 21 in that the edges 211 and 212 delimiting the opening 410 are also bent in a 90° offset in the direction of the interior of the machine frame 1, as was described above for the outer edges of the wall sections.

The described device can be altered in many ways within the framework of the instant invention, e.g. through the exchange of different elements and characteristics against equivalents or other combinations which are not described. For example, it is not necessary to use angles, in particular sheet metal angles as the connection elements 7, but other profiles, e.g. Z profiles can also be used, depending on the application and the location. Also cast pieces in the form of angles can be used without supports.

The connection element 7 connects adjoining frame walls among which are also the bottom 10, the cover plate 4 and the intermediate walls 6, if provided. If strong impact shocks are to be expected during transport or during the subsequent operation, the adjoining frame walls can be welded to each other at least at some points, in addition to being screwed together, in order to ensure under all circumstances that the precise relative alignment obtained by means of the combined plug-in and screw connection will be permanent.

In the described embodiments, pins 72 have been chosen for the plug-in connections, but other elements and non-round profiles can also be used, if this appears to be practical for any reason, e.g. when one single plug-in element must ensure a given angular position.

The edges which are offset at 90 degrees by a bending operation are as a rule directed toward the inside of the machine frame 1, since a substantially smooth outer wall is obtained in this way, even with sub-divided frame walls. If this is advantageous, such edges can also be interrupted in order to make room for a sheet-metal profile or similar object. Alternatively, it is also possible for such edges to extend to the outside (not shown), in order to create a labyrinth seal together with a door, for example.

That which applies to the connection elements 7 with respect to the design of the sheet metal also applies to other profiles which connect several frame walls to each other and which, depending on the task to be performed, can be made of sheet metal, cast pieces, etc. Such a profile can be used whether or not it supports structural and/or functional elements.

The machine frame 1 as described above is not only suitable as an end stock for long textile machines, but can also be used for smaller machines such as blow room machines, etc., in that case possibly without an intermediate wall being required.

The corners of the machine frame 1 can be constituted by the 90 degree offset edges, e.g. 27, 30 and 28 of the frame walls, e.g. 2 and 3 alone. Especially with large machine frames 1, it may be advisable to reinforce the corners of the machine frame 1 by means of additional sheet-metal corners 11 and 12 attached on the outside or on the inside.

It is intended that the present invention cover such modifications and variations as come within the scope of the appended claims and their equivalents.

We claim:

1. A machine frame for a textile machine, said machine frame comprising a plurality of frame walls formed substantially from sheet metal, said frame walls having offset vertical side edges formed substantially perpendicular to the plane of said frame walls, each of said frame walls being connected to a connection element for precise alignment of said frame walls and to at least one other said frame wall by way of said connection element, at least one of said frame walls supporting structural and functional elements through additional plug-in connections, at least one of said frame walls comprising a plurality of wall sections disposed in the same plane and a sheet metal profile interconnecting adjacent said wall sections, each of said wall sections comprising offset vertical side edges formed substantially perpendicular to the plane of said wall sections such that adjacent said side edges of said wall sections comprise adjacent offset edges, said profile interconnecting said wall sections across said adjacent offset edges.

2. The machine frame as in claim 1, further comprising screw connections for connecting said frame walls to said connection elements.

3. The machine frame as in claim 1, wherein said connection element comprises an angled element.

4. The machine frame as in claim 3, wherein said angled element comprises a sheet iron angle and includes at least one web support therealong, said web support being welded to said iron angle.

5. The machine frame as in claim 1, further comprising at least one weld connection between said connection element and said frame walls.

6. The machine frame as in claims 1, wherein said frame walls are connected to said connection element through pins and matching engaging holes for said pins.

7. The machine frame as in claim 1, wherein at least one of said frame walls defines a recess, said recess having 90 degree offset edges.

8. The machine frame as in claim 1, wherein said offset vertical edges are oriented towards the inside of said machine frame.

9. The machine frame as in claim 1, further comprising a sheet metal profile interconnecting adjacent said wall sections.

10. The machine frame as in claim 1, wherein said interconnecting profile is disposed opposite the side of said wall sections wherein said offset edges are oriented.

11. The machine frame as in claim 1, wherein said adjacent offset edges are spaced apart from each other, said profile bridging said space.

12. The machine frame as in claim 1, further comprising an additional interconnecting profile connecting at least two oppositely facing said frame walls within said machine frame.

13. The machine frame as in claim 12, wherein said interconnecting profile comprises a U-shaped member.

14. The machine frame as in claim 12, wherein said interconnecting profile is configured for supporting additional structural or functional elements.

15. The machine frame as in claim 1, wherein said interconnecting profile comprises a U-shaped member.

16. The machine frame as in claim 1, wherein said interconnecting profile is configured for supporting additional structural or functional elements.

17. The machine frame as in claim 1, further comprising at least one intermediate wall within said machine frame, said intermediate wall comprising a sheet metal supporting element.

18. The machine frame as in claim 1, further comprising sheet metal corner angles at the corners of said frame walls for aligning and supporting said frame walls.

19. The machine frame as in claim 1, further comprising a sheet metal profile interconnecting adjacent said frame walls.

* * * * *